(12) United States Patent  
Bartley et al.

(10) Patent No.: US 8,966,259 B2  
(45) Date of Patent: Feb. 24, 2015

(54) CONTROLLER-KEYPAD/CARD READER IDENTIFICATION SYSTEM INCLUDING CARD PROGRAMMING AND SECURE COMMUNICATIONS

(75) Inventors: Don Bartley, Reno, NV (US); Larry Gene Corwin, Jr., Phoenix, AZ (US); Robert C. Hunt, Reno, NV (US)

(73) Assignee: Securitron Magnalock Corporation, Phoenix, AZ (US)

( * ) Notice: Subject to any disclaimer, the term of this patent is extended or adjusted under 35 U.S.C. 154(b) by 165 days.

(21) Appl. No.: 13/618,244

(22) Filed: Sep. 14, 2012

(65) Prior Publication Data

US 2013/0073842 A1    Mar. 21, 2013

Related U.S. Application Data

(60) Provisional application No. 61/536,039, filed on Sep. 18, 2011.

(51) Int. Cl.
| | |
|---|---|
| *H04L 29/06* | (2006.01) |
| *G06F 21/00* | (2013.01) |
| *H04L 9/08* | (2006.01) |
| *G05B 19/02* | (2006.01) |
| *H01H 13/70* | (2006.01) |
| *G07C 9/00* | (2006.01) |

(52) U.S. Cl.
CPC .............. *H04L 9/0825* (2013.01); *G05B 19/02* (2013.01); *H01H 13/70* (2013.01); *H04L 9/0869* (2013.01); *G07C 9/00571* (2013.01); *G07C 9/00817* (2013.01); *G07C 2009/00849* (2013.01)
USPC .................... 713/168; 713/1; 726/2

(58) Field of Classification Search
CPC .............. H04L 9/0825; H04L 63/0869; H04L 63/0853; G05B 19/02; H01H 13/70; G06F 21/445; G06F 15/163; G06F 13/00
See application file for complete search history.

(56) References Cited

U.S. PATENT DOCUMENTS

2010/0034375 A1\*    2/2010   Davis et al. ..................... 380/42

\* cited by examiner

*Primary Examiner* — Izunna Okeke
(74) *Attorney, Agent, or Firm* — Woods Oviatt Gilman LLP; Ronald J. Kisicki, Esq.

(57) ABSTRACT

An access control system including bi-directional communication between a controller and peripheral authentication devices utilized for selectively accessing a locked door is provided. The access control system provides components and circuitry to enable a user to securely assign and designate any card reader compatible card as an appropriate programming card and thereby activate or deactivate users and/or cards. The present invention further provides encrypted communication between the controller device and a PC.

4 Claims, 22 Drawing Sheets

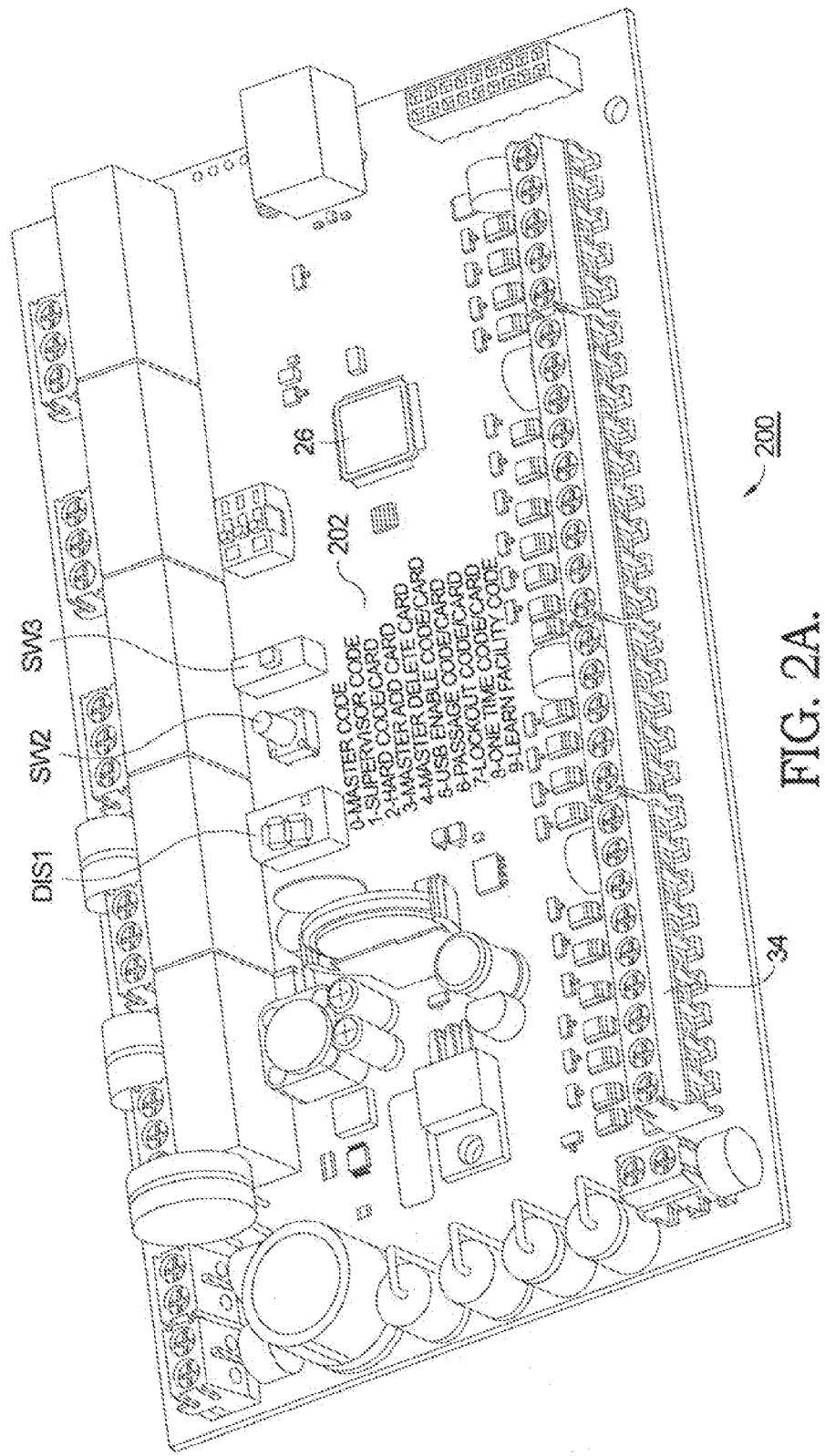

| Display | Mode |
|---|---|
| 0 | MASTER CODE |
| 1 | SUPERVISOR CODE |
| 2 | HARD CODE/CARD |
| 3 | MASTER ADD CARD |
| 4 | MASTER DELETE CARD |
| 5 | USB ENABLE CODE/CARD |
| 6 | PASSAGE CODE/CARD |
| 7 | LOCKOUT CODE/CARD |
| 8 | ONE TIME CODE/CARD |
| 9 | LEARN FACILITY CODE |

CONTROLLER-KEYPAD/CARD READER IDENTIFICATION SYSTEM INCLUDING CARD PROGRAMMING AND SECURE COMMUNICATIONS

This Application claims the benefit of U.S. Provisional Application No. 61/536,039, filed Sep. 18, 2011.

TECHNICAL FIELD

The present invention relates to secure communications with electronic access control systems comprising a controller and multiple authentication devices. The invention provides an authentication device identification methodology and a robust scheme for enabling the programming or reconfiguration of credentials and authorized identities. The present invention further provides an extension to the Wiegand communication protocol while remaining backward compatible with traditional Wiegand devices.

BACKGROUND OF THE INVENTION

There are numerous deployments and varieties of electronic locks that are utilized to provide secure access to buildings or other objects, for example, safes, automobiles, etc. Authentication is generally provided through a wide variety of means including keypads, cards, bio readers and other authentication input devices. In conjunction with the deployments, a need has developed for various types of functions or information relating to the secured door with which one needs to communicate. Improvements to the security, installation, maintenance, adding or removing users, and support of access control devices are also areas of growing need. For example, it is frequently desirable in a security system application project to enable the integration of components or devices from different manufacturers. This presents a number of challenges particularly when components may not communicate in the same manner or support the same signals, for example. To address this issue in the case of card reader based authentication devices, a de facto wiring standard was developed for card readers—the Wiegand interface. The interface is utilized to connect card readers to a controller and/or the rest of the access control system. Wiegand is also used as an interface in time and attendance systems. The Wiegand interface utilizes three wires. One wire is a common ground and the other two wires are used for data transmission (Gnd, DATA0, DATA1). Zeros are impulses on the DATA0 line and ones are impulses on the DATA1 line. The communication protocol used on a Wiegand interface is referred to as the Wiegand protocol. In the Wiegand protocol, data bits are prefixed and postfixed with parity, and length/chunks of data bits can vary from 24 to 40 bits. The Wiegand protocol provides a level of compatibility and interoperability for readers and control panels that can be used by consultants, specifiers, and end users when setting product design or system installation criteria.

Numerous companies have developed their own custom variations of the Wiegand format. Typically, the alternatives are developed by those that require more codes. One such variation is the 39 bit Wiegand format, which contains 17 bits for the facility code and 20 bits for the ID number field. Consequently, this allows for a total of 131,072 facility codes, and the 20 ID number bits allow for a total of 1,048,576 individual IDs within each facility code.

Irrespective of the code variation however, the Wiegand based data communication between a controller and a card reader or other peripheral device has always been unidirectional. The peripheral device sends data to the controller but there is no data communication in the other direction. This presents several drawbacks and limits what can be done. For example, because the controller has no bi-directional data communication with the reader, reader device identification or reader device authentication is not possible. Newer access systems are thus unable to provide extended features if they want to remain compatible with the de facto communication standard.

Another issue that plagues the traditional access control systems that utilize a card reader and controller relates to the method for programming the controller, such as maintaining credentials or authorized identities. Such maintenance might include user card management, i.e., adding or deleting user cards to/from the system, or perhaps performing user identification code changes.

Heretofore, card readers require specialty cards that are encoded as programming cards (i.e., cards that will allow the end user to make maintenance changes such as user card management). For example, a particular programming card would be provided to the end user from the manufacturer to be used for placing the controller into 'add mode' and another card may be provided for placing the controller into 'delete mode.' When the controller is in add mode, it essentially learns a new credential that is presented to it, for example, a new badge for user Joe that will provide access to doors 1 and 4 only on the 10th floor of the building. In delete mode, it will delete the credential that is presented (i.e., remove the authorization access associated with the presented card).

These specialty program cards have to be provided by the manufacturer, and if a specialty program card is lost, a replacement card would have to be ordered from the manufacturer. This requirement and method is at best cumbersome and inefficient, it places the end user company at the mercy of the manufacturer and worse yet could pose a major security risk. For example, when there is an immediate need perhaps to delete a particular card user's credential from the system over a weekend or holiday period, the company would be vulnerable in the event of a lost program 'delete card' until the company can reach the manufacturer and ultimately have a new program delete card delivered on site.

Further, in the prior art, retrieval of a forgotten user code or password could be achieved by the user reciting the answer to a previously provided secret question. However, if the answer is unknown because the previous user has left the company, replacement of the old user code/password could not be accomplished without replacing an EEPROM hard-soldered to the circuit board. Once again, the company's security could be vulnerable during the down time to replace the EEPROM.

Yet another issue that affects the industry relates to the issue of communication between a personal computer (PC) and the controller of the access control system. Data in the form of configuration information, software updates, and report information is generally communicated between the PC and the controller via a Universal Serial Bus (USB) port. Such transmitted data needs to be encrypted for security reasons. However, a number of problems exist with traditional and currently available solutions.

One solution has been the use of a Private static cipher key that is hard coded into both the PC program and the controller. If the private key is ever discovered all controller units become compromised.

Another solution is a private static cipher key that pairs a particular controller to a particular PC. Having multiple private keys increases security as the compromise of one controller unit does not compromise all the other addresses and resolves the earlier problem. However, the problem in this case lies in the fact that the controller is now stuck or locked into a single PC. This means that only the particular PC can be used to communicate with that controller. This could be problematic to the customer should that PC get damaged or someone else needs to take over the task of managing the controller with their own PC.

Yet another solution is public key asymmetric cryptology. This option is widely used across the board and on the internet. It is proven and is secure but it requires more 'horsepower' than is vailable with the microcontroller typically found in most access control system controllers. As such this method is not technologically feasible to implement on the controller.

What is needed is a system and method that allows bi-directional data communication between a controller and peripheral devices, which is versatile enough to accommodate enhanced surveillance or security features, without the drawbacks described above. Further, a robust system that would enable for example, any standard Wiegand 2601 card to become the "Master Add" or "Master Delete" card for the controller, while providing ease of installation and avoiding the short comings of current systems, would be advantageous. Further still, providing for dynamically generated cryptographic keys in a PC and the controller of an access control system during each communication occurrence, without the use of standard public key algorithms, would also be advantageous. The present invention fills these as well as other needs.

SUMMARY OF THE INVENTION

In order to overcome the above stated problems, in one aspect, the present invention provides a controller and authentication device having features and advantages in the physical components, design and configuration of the device.

According to another aspect of the present invention a protocol that conforms to the Wiegand protocol while providing added features and advantages in the circuits of the access control system devices is provided. The protocol provides for bi-directional data communication between the controller and peripheral authentication devices.

In a further aspect of the present invention, user controlled identity authorization/credentialing "Master Delete" and "Master Add" cards are provided. The identity authorization enables a user to securely assign and designate a conventional card reader compatible card as an appropriate programming card and thereby readily activate or deactivate users and/or cards.

In another aspect of the present invention, communication between the controller device and a PC, via the USB port, is encrypted in a manner that is secure and feasible within the processing constraints of the controller device's computing power.

Additional benefits of the above described system and method for providing power and data communication respecting a door and lock are set forth in the following discussion.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein:

FIG. 2A is an isometric view of a printed circuit board of a controller device according to an embodiment of the present invention;

FIG. 2B is a listing of available modes for the controller device along with the corresponding display values;

DETAILED DESCRIPTION OF THE PREFERRED EMBODIMENT

Generally, the systems, components and methods described herein for providing and implementing communication, programming, encryption and associated features for an Access Control System (ACS) to provide secure entry to a door or closure may be implemented in a variety of hardware and component configurations, software or combinations thereof.

This document is organized as follows. First, an overview of the ACS in accordance with certain aspects of the present invention is described. Next the controller and keypad components of the ACS that achieve some aspects of the invention are described along with the details of their electronic circuitry. Next, the operational flow for establishing data communication between the controller and a card reader or keypad is described. Next the operating environment for programming and managing authentication identities using the controller and keypad is discussed. Following this, the logic and operational flow for providing the encryption of data in the communication between a personal computing device and the controller is presented. Thereafter, there is a discussion of the physical aspects of an exemplary keypad according to the present invention.

In the following discussion, whenever the term ACS is used, it is understood the card reader/keypad and controller disclosed are only part of of the entire access control system and that the ACS referred to herein is not an entire system, lacking for example, the electromechanical release component.

Figure 1:
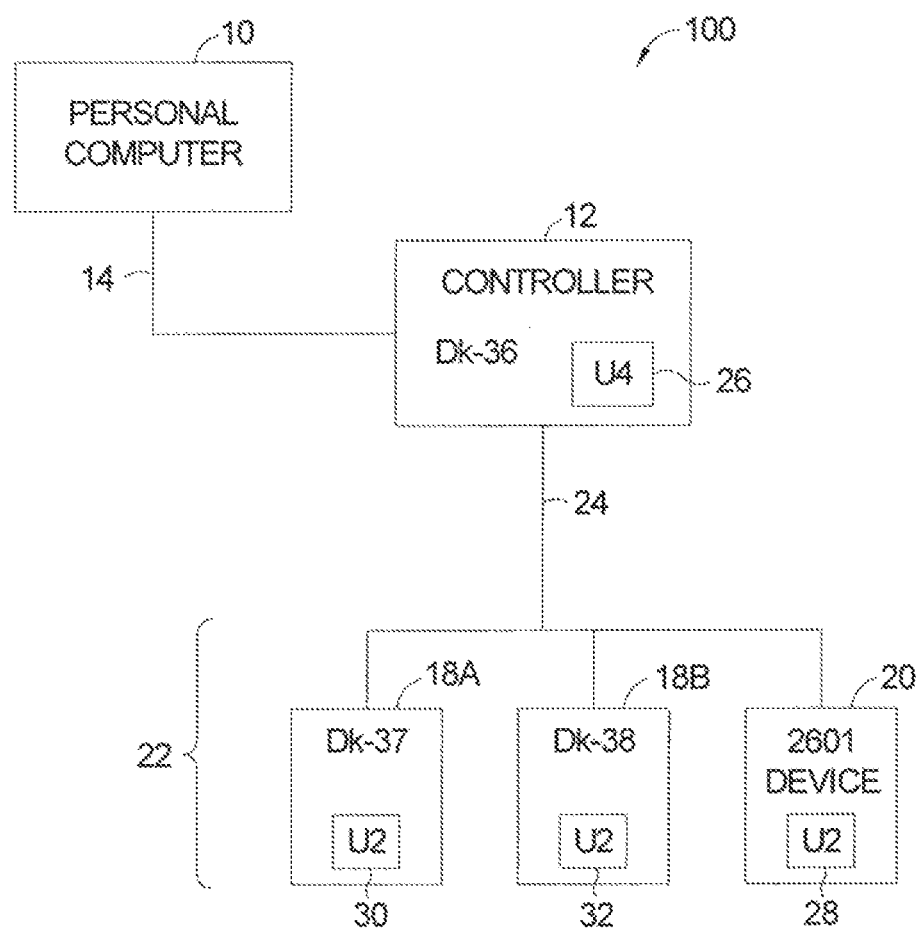
FIG. 1 is a component block diagram of an exemplary credential verification portion of an access control system in accordance with aspects of the present invention.

Referring to the drawings and initially to FIG. 1, an ACS is provided and is identified as reference number 100. In general, ACS 100 is configured for providing selective access in medium/high security control of electric locks, electric strikes, or magnetic locking devices. The ACS 100 may include a PC 10 that is configured to communicate with a multi-access controller 12 via communication link 14. The controller 12 communicates with keypads 18A, 18B and Wiegand 2601 card reader 20, (collectively referred to as authentication devices 22) via communication medium 24. The peripheral authentication devices referred to in the following description may be keypads, card readers, or a mixture of both. The terms card reader or keypad as used throughout are interchangeable unless specifically identified otherwise. The controller 12 includes a microcontroller 26 that provides communication, signaling, and processing. Similarly, although less robust and capable, the card reader 20, and keypads 18A, 18B also include microcontrollers 28, 30 and 32, respectively. While aspects of the present invention are described with reference to a card reader or keypad, it should be understood that the present invention is also applicable to biometric readers or any other authentication devices that may be utilized to provide identification for purposes of access to a secured location or object.

The components and details of the controller 12 will be described next with reference to FIGS. 2A, 2B and 3. FIG. 2A illustrates a pictorial view of a printed circuit board (PCB) 200 of an embodiment of the detailed schematic diagram of the controller circuit 300 shown in FIG. 3.

In one aspect of the invention and as best seen in FIG. 2A, controller 12 of FIG. 1 comprises the printed circuit board (PCB) 200 having thereon a number of electronic components including microcontroller 26, a terminal strip 34, a display DIS1, pushbutton SW2, and slide switch SW3. Adjacent to Display DIS1 is a listing 202 (See also FIG. 2B) of operating modes/status of the controller 12 that correspond to the numeric values that may be displayed on display DIS1. In operation, pressing the pushbutton SW2 places the controller 12 in one of the operating modes of the listing 202. FIG. 2B illustrates the listing 202 including the available operation modes and corresponding display DIS1 values.

Figure 3:
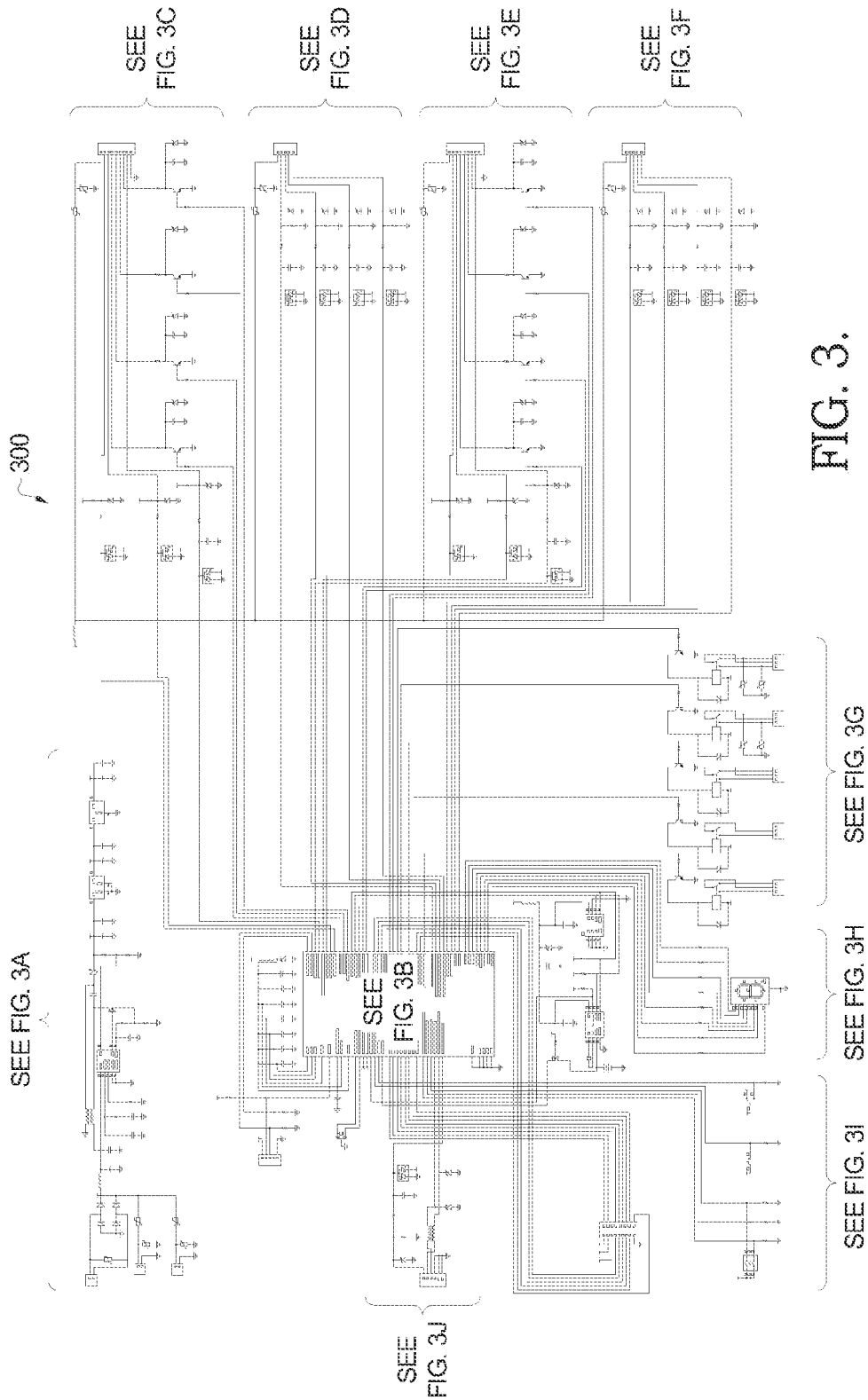
FIG. 3 is a schematic diagram of the circuitry implemented in an exemplary embodiment of the controller device of the present invention.
Figure 3A:
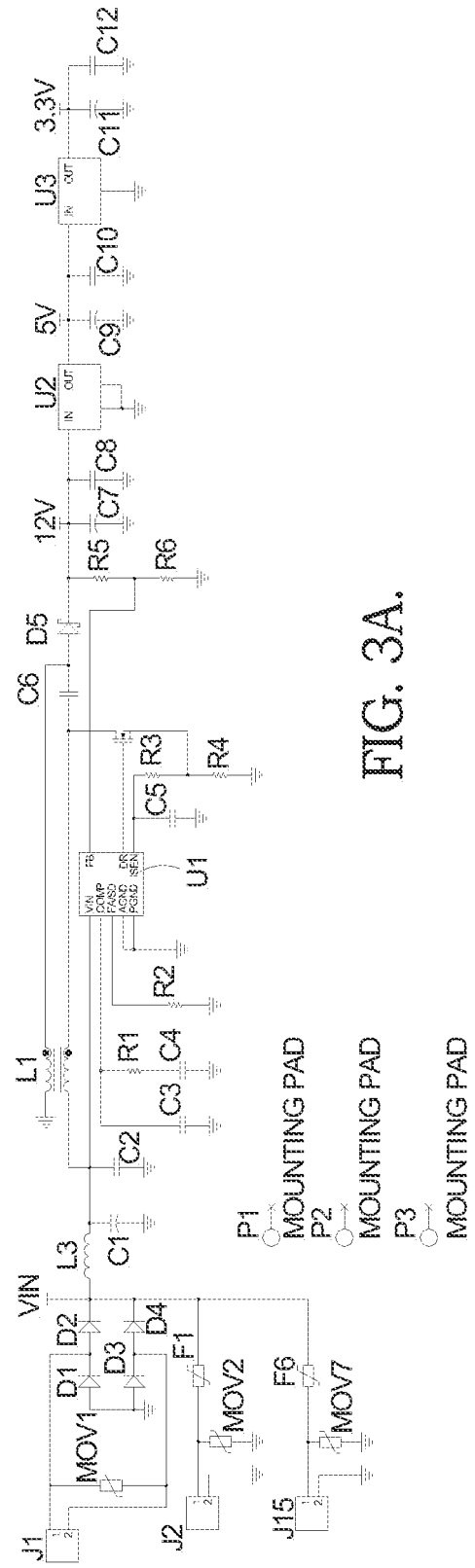
FIGS. 3A-3J are magnified segments of diagram FIG. 3, as designated in FIG. 3.
Figure 3B:
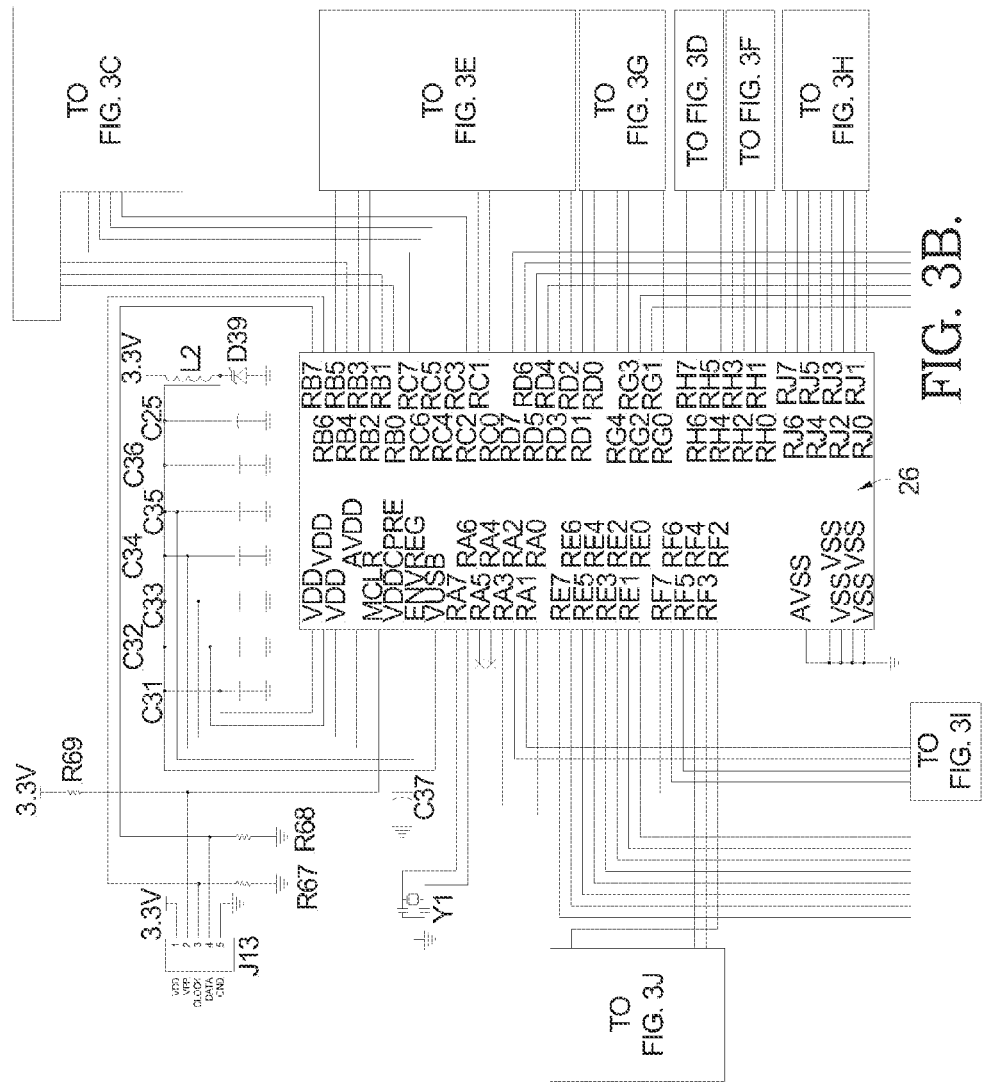
Figure 3C:
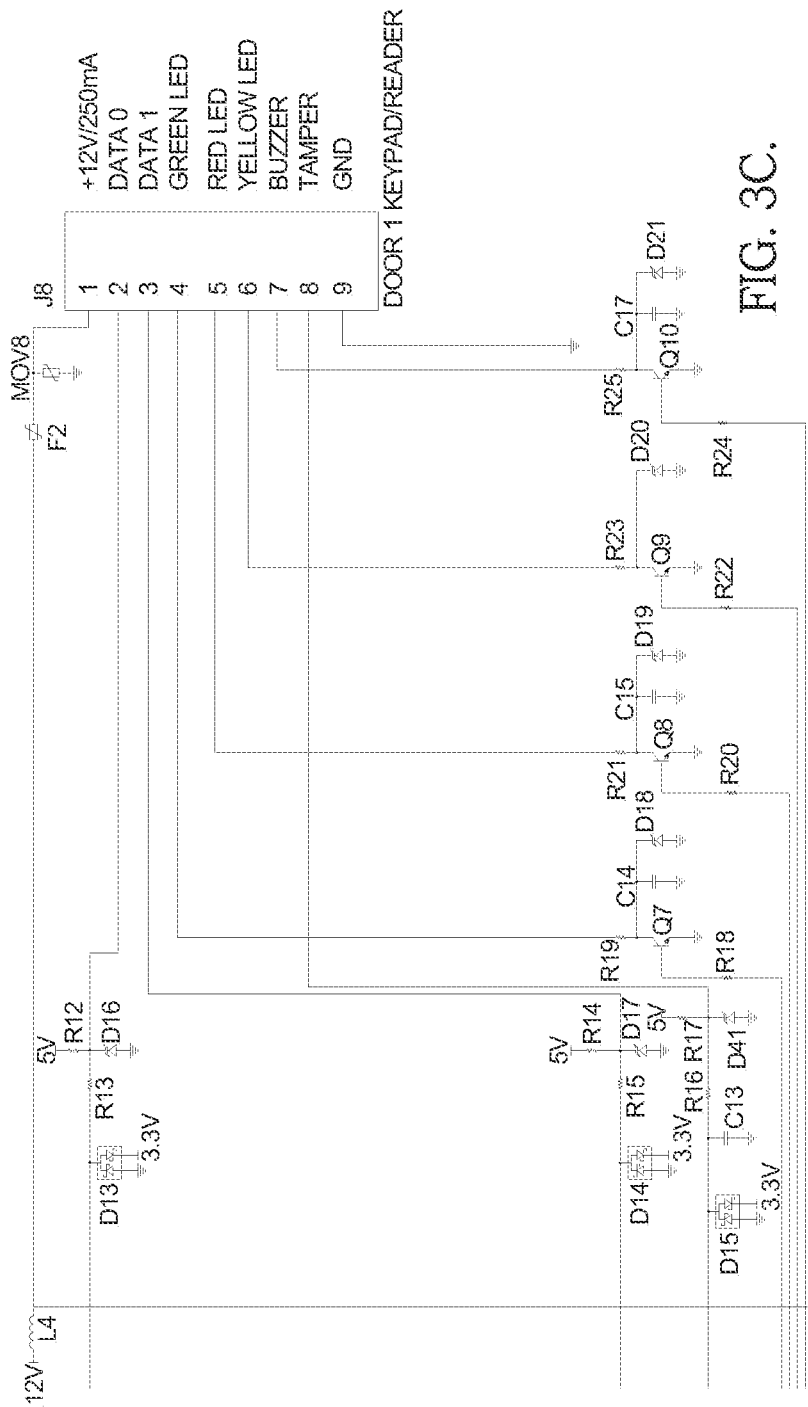

Turning to FIG. 3 and with reference thereto, the circuit 300 includes connector J2 (FIG. 3A) for the connection of an AC or DC power supply for a voltage that is rectified, filtered then applied to a DC to DC converter U1 (FIG. 3A) to provide 12 V DC and further applied to voltage regulators U2, U3 (FIG. 3A) to provide 5 V DC and 3.3 V DC, respectively, for powering the other components of the circuit 300. Connectors J8 (FIG. 3C) and J10 (FIG. 3E) provide means for connecting the microcontroller 26 (FIG. 3B) to two authentication devices 22. The connectors J8 (FIG. 3C), J10 (FIG. 3E) each include terminals 1-9, for each of a 12 V power supply, DATA0, DATA1, Green LED, Red LED, Yellow LED, Buzzer, Tamper Switch and Ground. The terminals of Green LED, Red LED, Yellow LED and Buzzer are connected to open collector transistors Q7, Q8, Q9, Q10 (FIG. 3C) which are driven by ports RC 7, RC 6, RC 5, RC2 of the microcontroller 26 (FIG. 3B). These terminals 1-9 provide status signals to components housed in the authentication devices 22. DATA0 and DATA1 are connected to ports RB0 and RB1 (FIG. 3B), respectively, and provide the means for receiving data communications from the authentication devices 22.

Figure 3D:
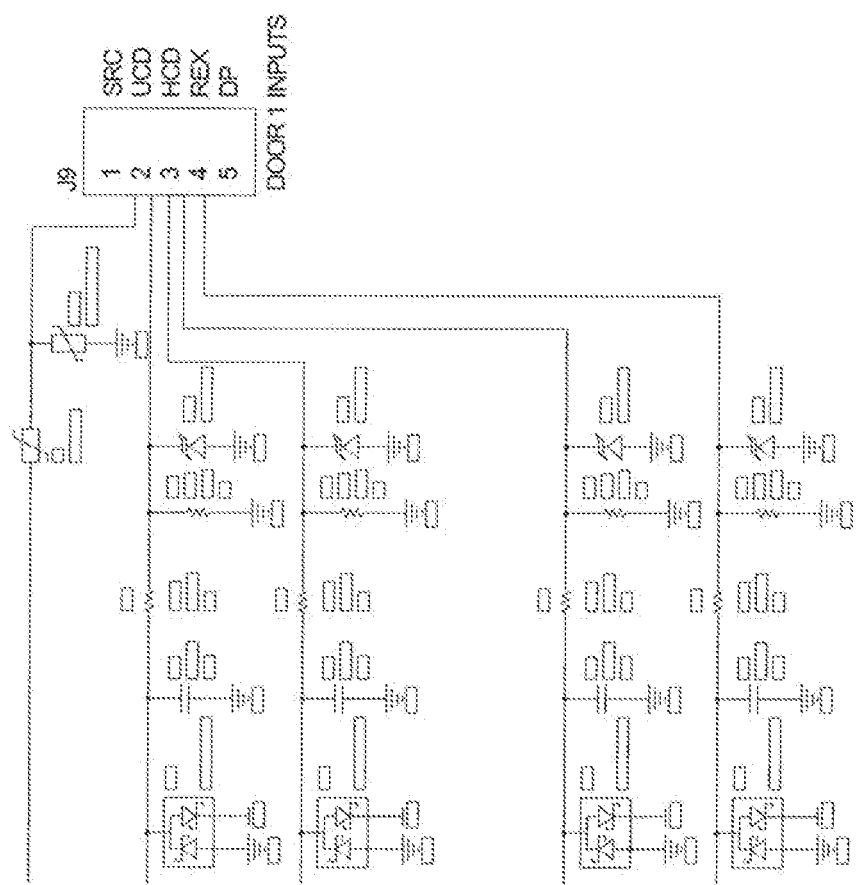
Figure 3E:
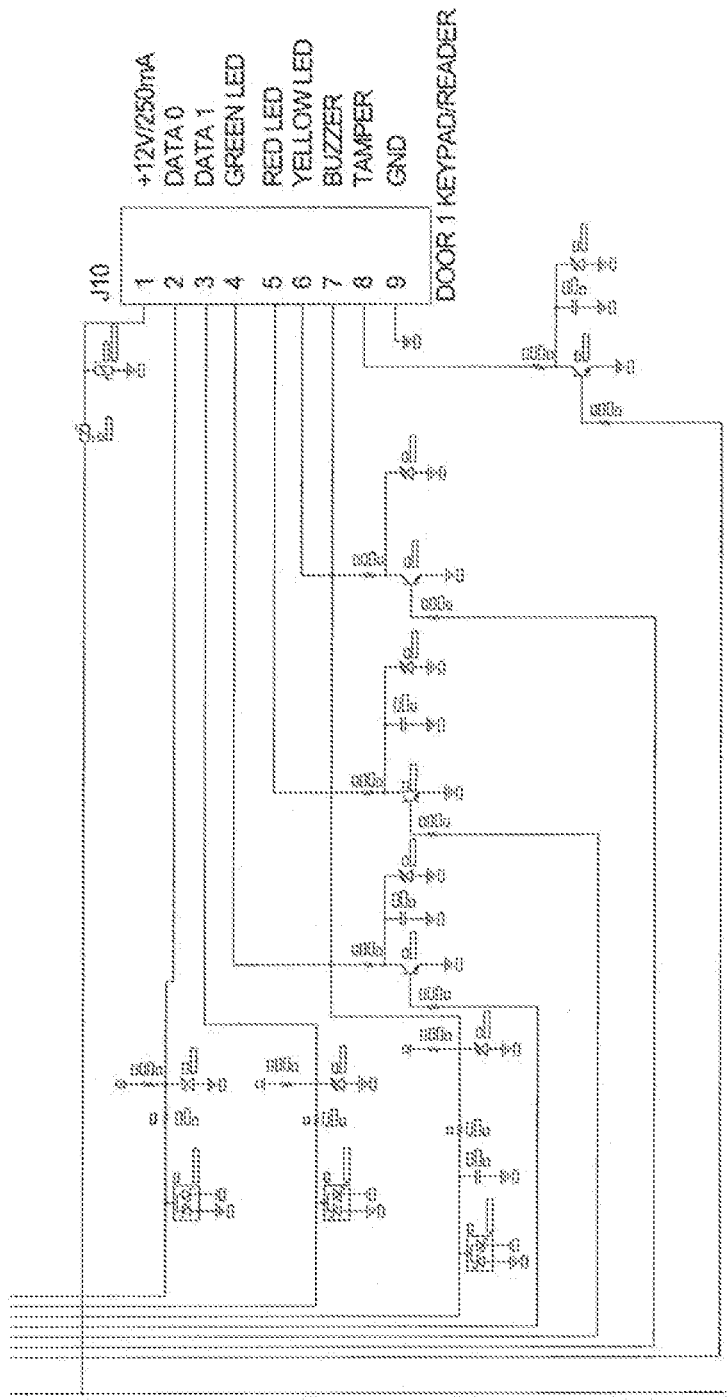
Figure 3F:
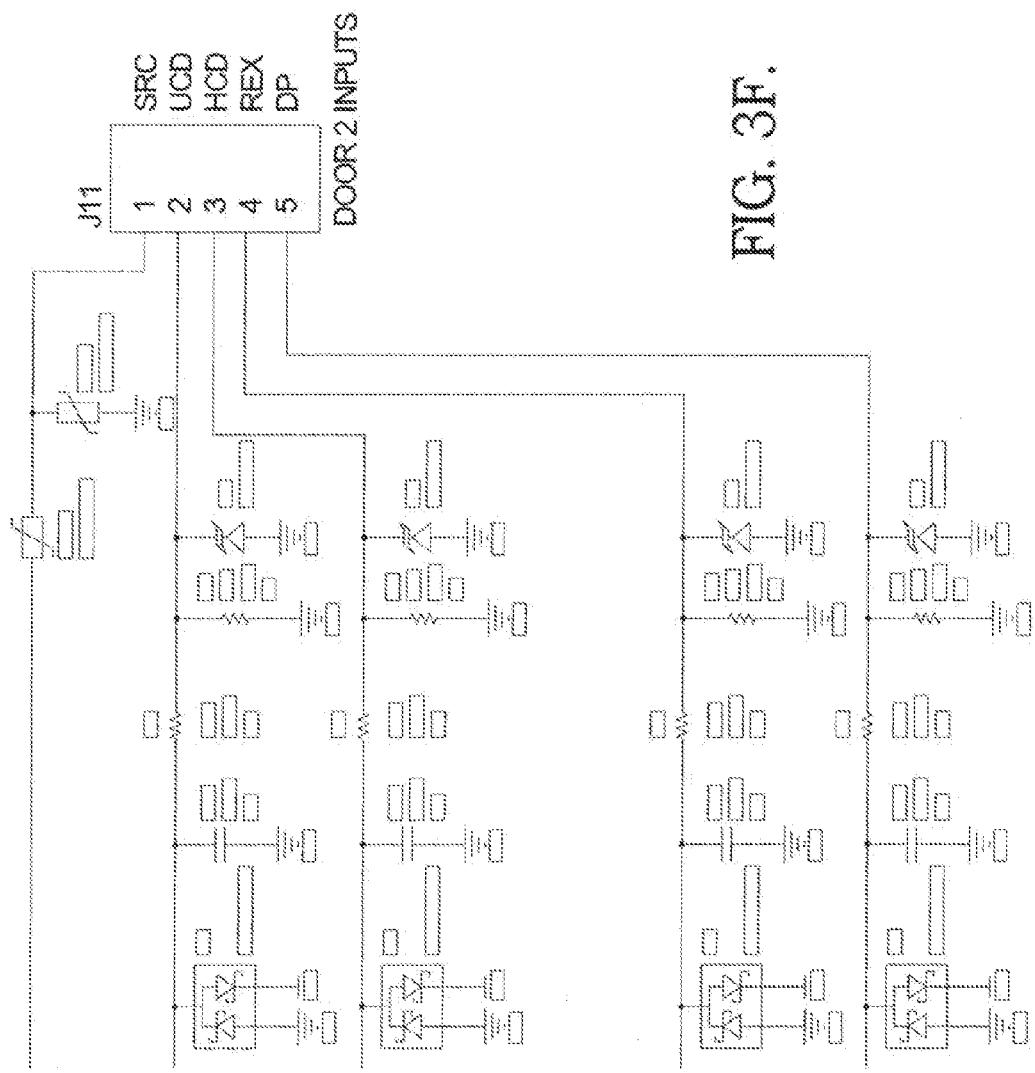
Figure 3G:
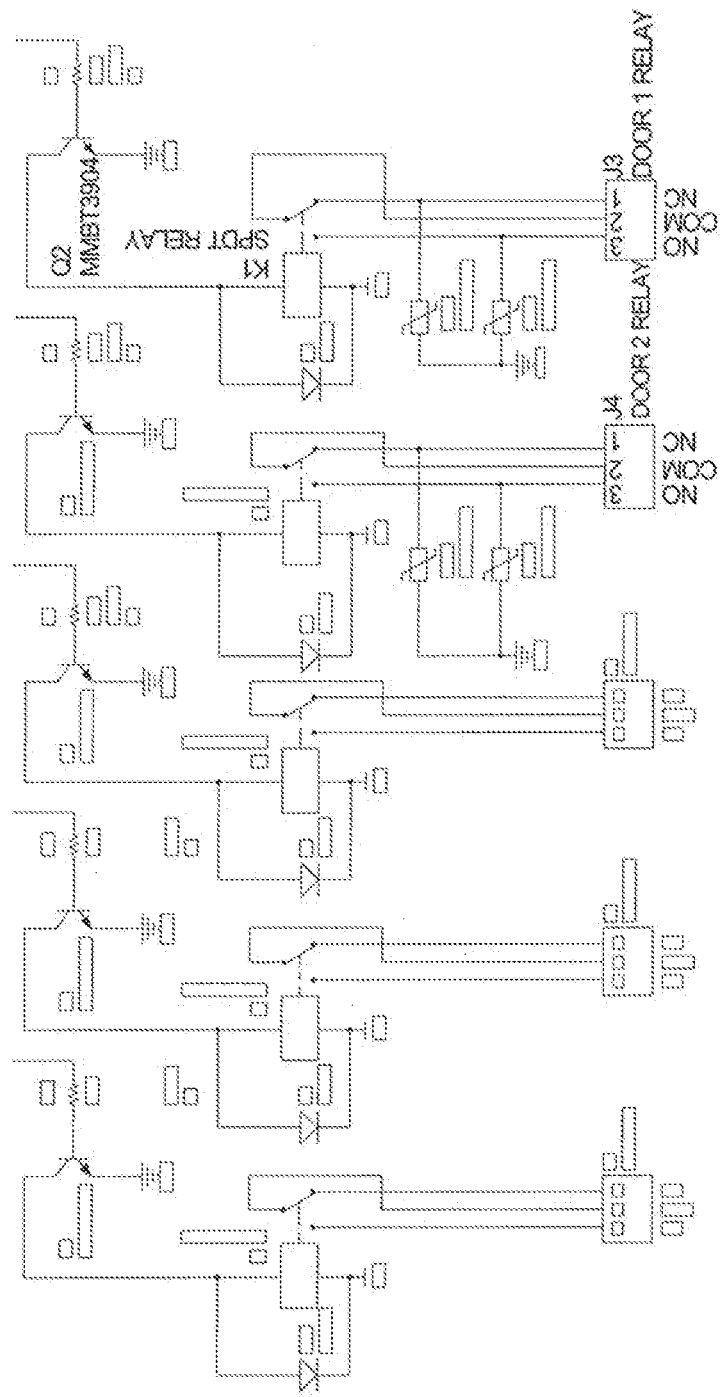
Figure 3H:
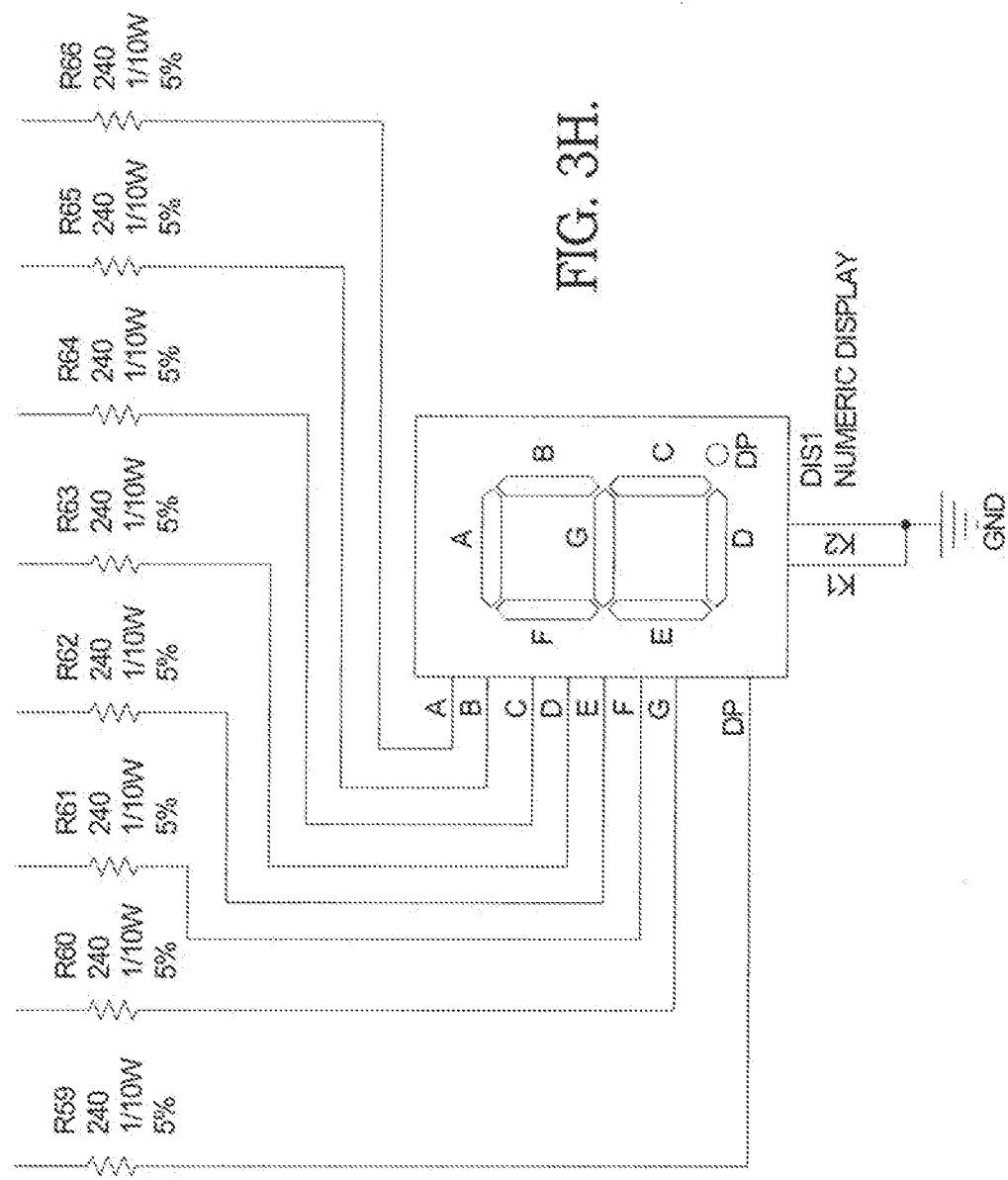
Figure 3L:
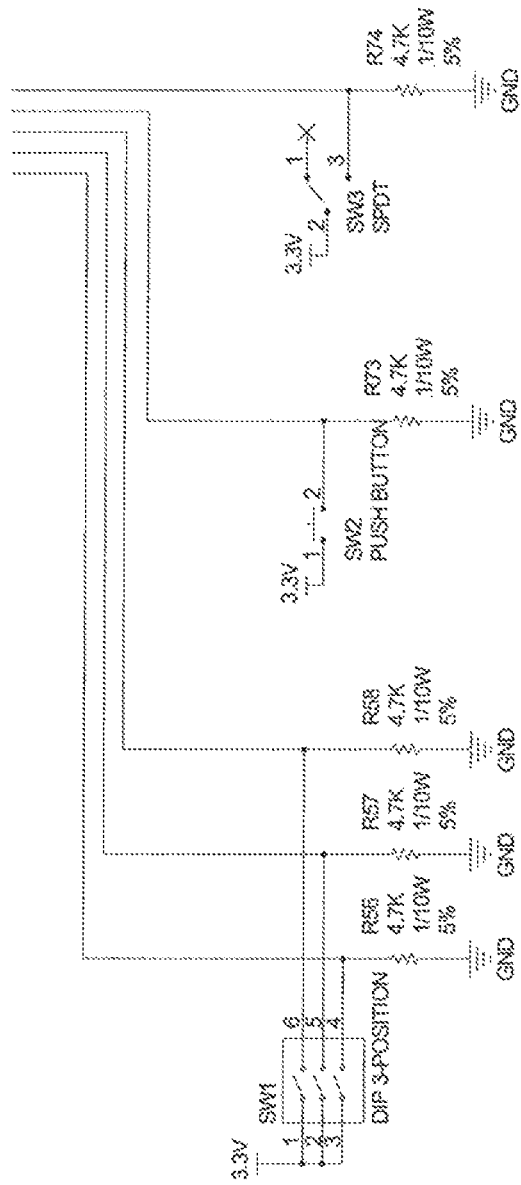
Figure 3J:
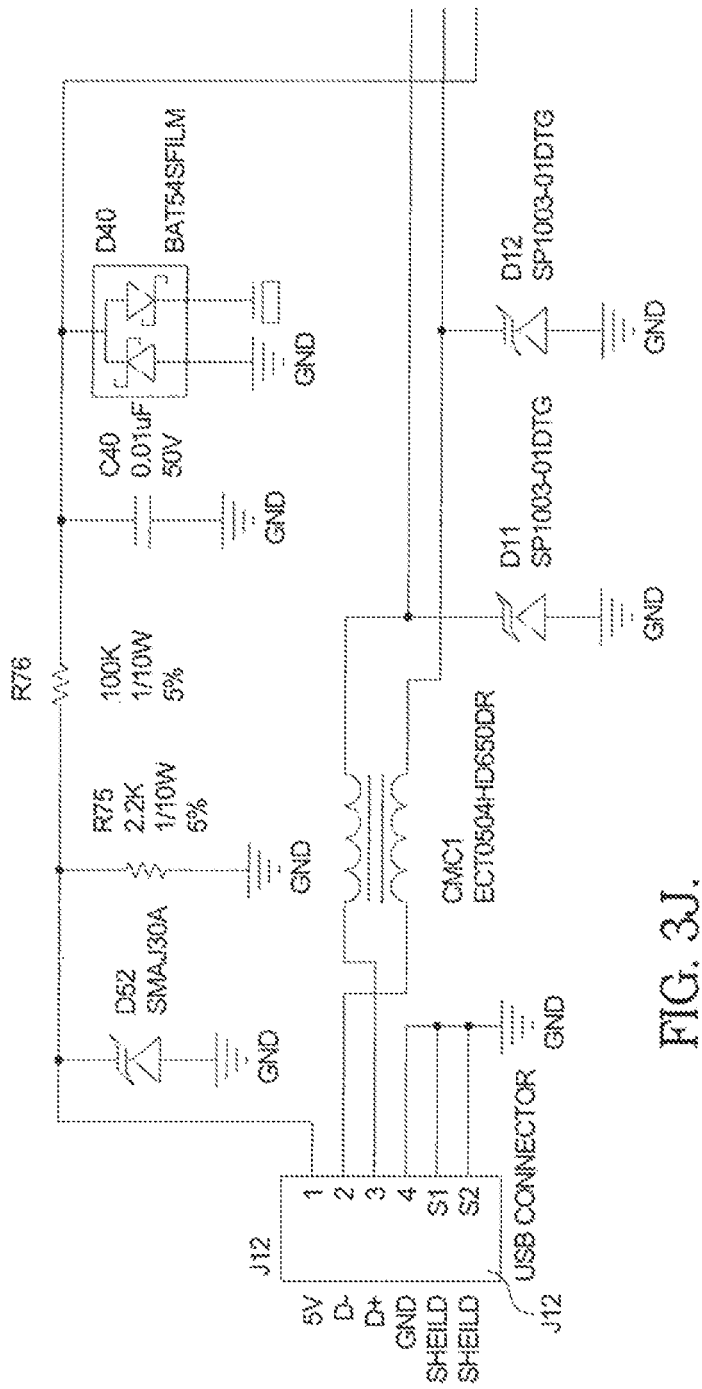

Connectors J9 (FIG. 3D) and J11 (FIG. 3F) provide means for connecting and receiving signals at the microcontroller 26 (FIG. 3B) from the authentication devices 22. Such signals include for example a Request to Exit (REX) signal or Door Position (DP). In an aspect of the present invention, connector J9 (FIG. 3D) is utilized to connect keypad 18A (FIG. 1) and connector J11 (FIG. 3F) is utilized to connect keypad 18B (FIG. 1). Connectors J3 (FIG. 3G) and J4 (FIG. 3G) provide connectivity for door relays/coils that can be controlled from the microcontroller 26 (FIG. 1). For example, relay/coil for door1 would be connected to J3 (FIG. 3G) and be controlled by the Single Pole Double Throw (SPDT) relay K1 (FIG. 3G). Relay K1 is driven by common emitter transistor Q2 (FIG. 3G), which is controlled by on/off signals to digital port RD1 of the microcontroller 26 (FIG. 3B). Display DIS1 (FIG. 3H) is connected to ports RJ0-RJ7 of the microcontroller 26 (FIG. 1). Push button SW2 (FIG. 3I) is shown connected to port RA2 and Switch SW3 (FIG. 3I), which is a single pole double throw switch, is connected to port RA1. Connector J12 (FIG. 3J) is the USB connector for communications between the microcontroller 26 and other external devices. Connector J12 is coupled to ports RF2, RF3, RF4 and ground GND of the microcontroller 26 (FIG. 3B).

Figure 4:
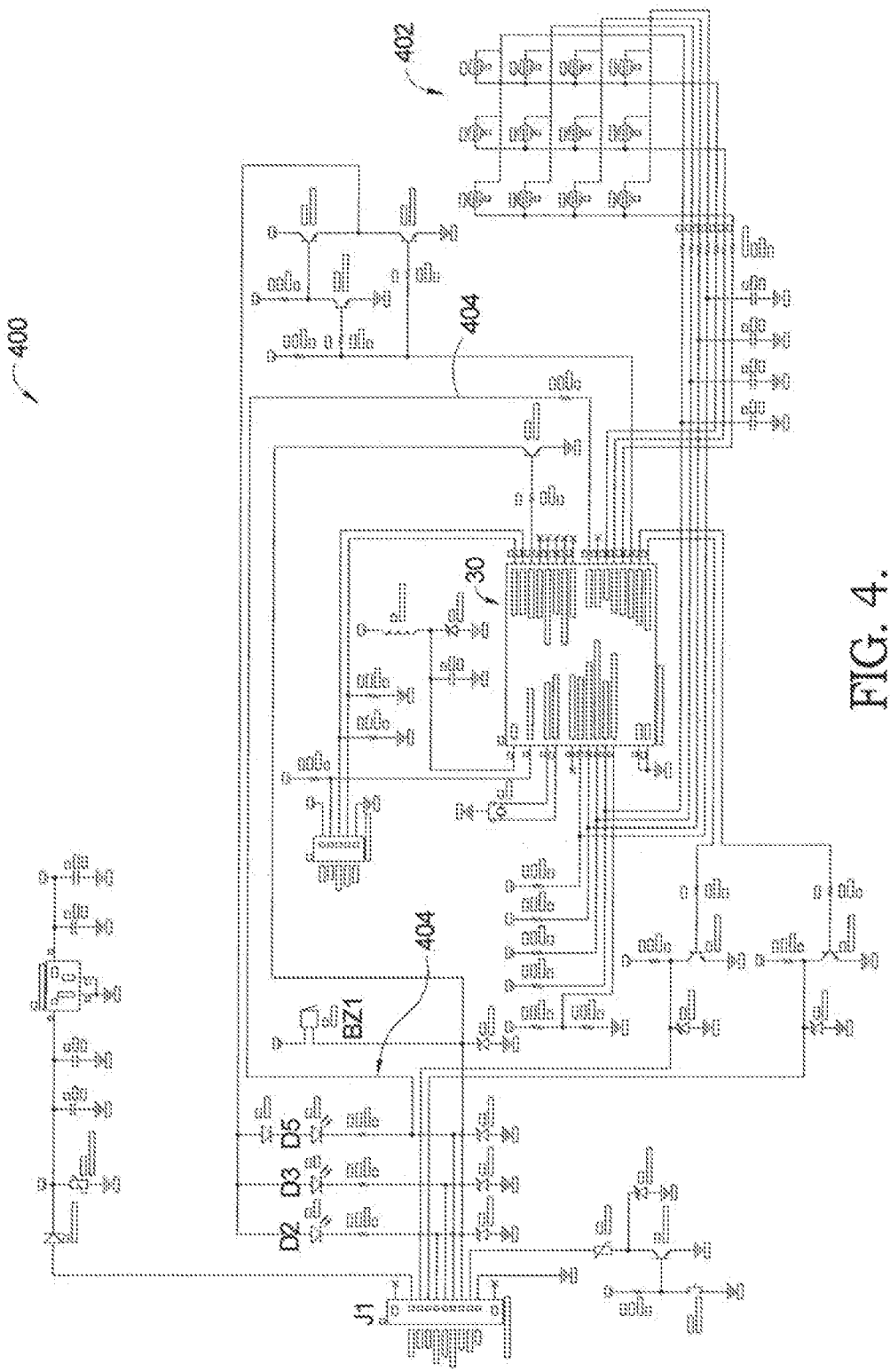
FIG. 4 is a schematic diagram of the circuitry implemented in a first keypad according to an embodiment of the present invention.
Figure 5:
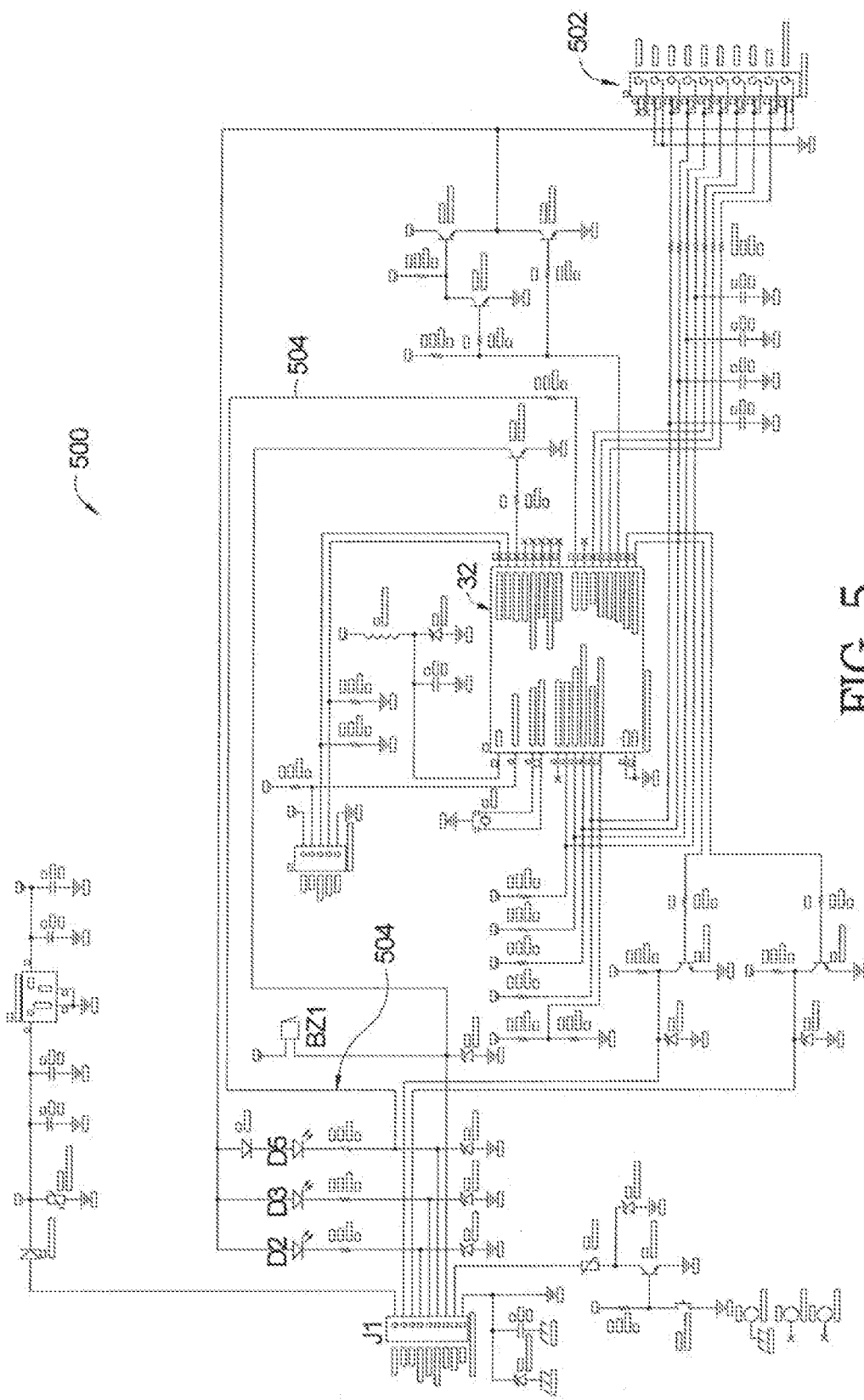
FIG. 5 is a schematic diagram of the circuitry implemented in a second alternative keypad in the present invention.

Next, the components and details of the keypads 18A, 18B will be described with reference to FIG. 4 and, in an alternate circuitry, FIG. 5. It should be understood that the discussions herein respecting the keypads 18A, 18B would be equally applicable to the card reader 20, with the exception of the readily apparent distinctions, such as the fact that all data from the card reader is provided by means other than key presses.

The circuit 400 may be associated with keypad 18A and comprises the microcontroller 30, a 9-position connector J1, Green LED D2, Red LED D3, Yellow LED D5, buzzer BZ1 and a switch matrix 402. The Connector J1 provides terminals for each of a 12 V power supply, DATA0, DATA1, Green LED, Red LED, Yellow LED, Buzzer, Tamper Switch and Ground. When the keypad 18A is connected to the controller 12, terminal J1 of keypad circuit 400 is wired to terminal J8 (FIG. 3C) of controller circuit 300. As would be appreciated by one skilled in the art, keypad 18A and controller 12 could be connected entirely or in part by a wireless connection, alternate communication schemes, or other mediums and such variations are contemplated and within the scope of the present invention.

Connection of the terminal J1 (FIG. 4) of circuit 400 to terminal J8 (FIG. 3C) of circuit 300 enables the controller 12 to receive data on DATA0 and DATA1 from the keypad 18A. The controller 12 is able to turn on or off Green LED D2, Red LED D3, Yellow LED D5, and buzzer BZ1. As shown, buzzer BZ1 is coupled to port RB 5 of the keyboard microcontroller 30 and therefore can also be activated by the keyboard 18A. A connector 404 from the Yellow LED to port RC7/RX of the microcontroller 30 ties the synchronous communication port of the microcontroller 30 to the Yellow LED D5 and to position 6 on the terminal J1.

Similar to circuit 400 of keypad 18A, alternate circuit 500 may be associated with keypad 18B and comprises the microcontroller 32, a 9-position connector J1, Green LED D2, Red LED D3, Yellow LED D5, buzzer BZ1 and a switch matrix 502. The Connector J1 provides terminals for each of a 12 V power supply, DATA0, DATA1, Green LED, Red LED, Yellow LED, Buzzer, Tamper Switch and Ground. When the keypad 18B is connected to the controller 12, terminal J1 of keypad circuit 500 is wired to terminal J10 of controller circuit 300 (FIG. 3E). As would be appreciated by one skilled in the art, keypad 18B and controller 12 could be connected entirely or in part by a wireless connection, alternate communication schemes, or other mediums and such variations are contemplated and within the scope of the present invention.

Connection of the terminal J1 of circuit 500 to terminal J10 (FIG. 3E) of circuit 300 enables the controller 12 to receive data on DATA0 and DATA1 from the keypad 18B. The controller 12 is able to turn on or off Green LED D2, Red LED D3, Yellow LED D5, and buzzer BZ1. As shown, buzzer BZ1 is coupled to port RB5 of the keyboard microcontroller 32. As such buzzer BZ1 can also be activated by the keyboard 18B. A connector 504 from the Yellow LED to port RC7/RX of the microcontroller 32 enables synchronous communication from the controller 12 to the microcontroller 32 of the keypad 18B.

To reiterate and further clarify the functional effect of the described circuit couplings, the present invention provides means for controller 12 to engage in two-way data communication with Keypad 18A and Keypad 18B. As stated earlier, conventionally, because the controller 12 and keypads 18A, 18B conform to the Wiegand communications protocol there is only one-way data communication, i.e., from keypad 18A, 18B to controller 12 as provided on DATA0 and DATA1. However, the controller 12 of the present invention is adapted to also transmit data to the keypad 18A, 18B, using a shared conductor between the two units, i.e., one of the open collector driver connections from terminals J8 (FIG. 3C), J10 (FIG. 3E) of controller 12 to terminal J1 on each of the Keypads 18A, 18B.

Specifically, and as shown in the associated schematic diagrams, the conductor associated with a status mode indicator such as, for example Yellow LED D5 on each of the Keypads 18A, 18B, is connected to the position 6 on terminal J1, corresponding to the open collector driver on position 6 of terminal J8 (FIG. 3C) and also position 6 of terminal J10 (FIG. 3E) of the controller 12. The microcontroller 26 which is a PIC18F87J50 microcontroller includes an internal Universal Synchronous Receiver/Transmitter (USART) that can be accessed at ports RC6/TX and RC7/RX. Similarly, the Yellow LED D5 on the schematics 400, 500 has a connection 404, 504, to the internal USART of the respective microcontrollers 30, 32.

Figure 6:
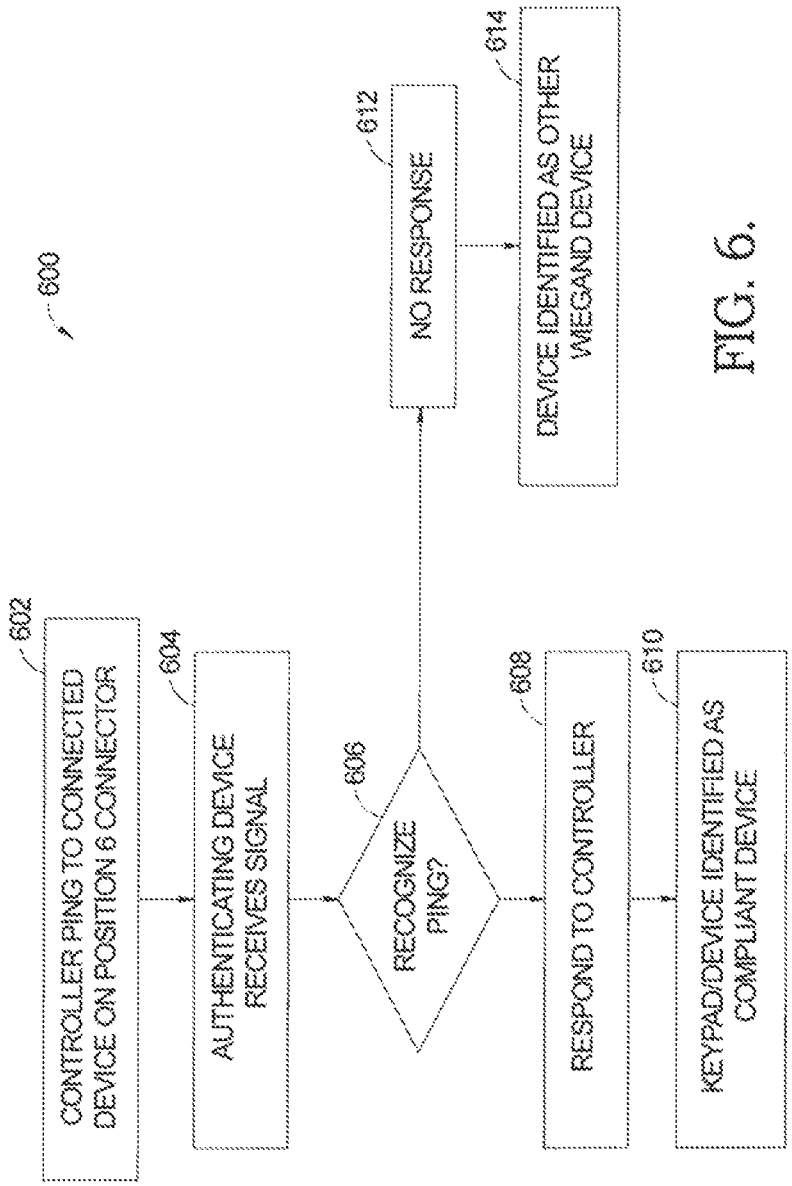
FIG. 6 is an exemplary operational flow chart for the communication between the controller and card reader according to an aspect of the present invention.

In further operation, and as best described with reference to flow diagram 600 of FIG. 6, the present invention enables two way communication between the controller 12 and authenticating devices 22, as shown in FIG. 1. At step 602, when the controller 12 powers up, the controller 12 pings the connected keypads 18A, 18B through the shared conductor, i.e., the wire connected between the positions 6 of each device. The keypads 18A, 18B or any other Wiegand device 20 that is connected to the controller will receive the ping at step 604. At step 606, an inquiry is made regarding whether the device recognizes the ping as data from the controller 12. If the recipient device is keypad 18A, 18B, or card reader 20 a response is sent to the controller 12 through the Wiegand interface (i.e., DATA0, DATA1), at step 608. The response thus identifies the Keypads 18A, 18B or card reader 20 to the controller 12 at step 610. Conversely, at step 606 if the recipient device is any other Wiegand device, there would be no response to the controller 12 at step 612. The device is thus identified as simply a traditional Wiegand device at step 614.

The firmware of the keypad 18A, 18B or card reader 20 is set up to ignore long pulses that might normally be seen on the yellow LED, such as blinking or steady on, and only respond to data fitting an 8-bit 9600 baud signal. When not in use as a communication line, the yellow LED's purpose is to indicate that the controller 12 is in the programming mode. This purpose is not affected by the use of the line for data communications to the keypad.

As previously stated, the purpose of the ACS 100 is to provide secure access through one or more authenticating devices 22 that are connected to a controller 12. The controller generally has, or is in communication with, a data store of credential identities that would be granted access. Credential identities are added or removed as desired by security personnel. In the case of the card reader 20, it is ordinarily the case in the prior art that in order to either add or delete a card associated with a particular user, an appropriately encoded manufacturer designated card (Master Add or Master Delete) must first be swiped through the card reader in order to put the controller into a mode where it can either add or delete the card record, whichever is appropriate. In an aspect of the present invention, this requirement is eliminated.

Figure 7:
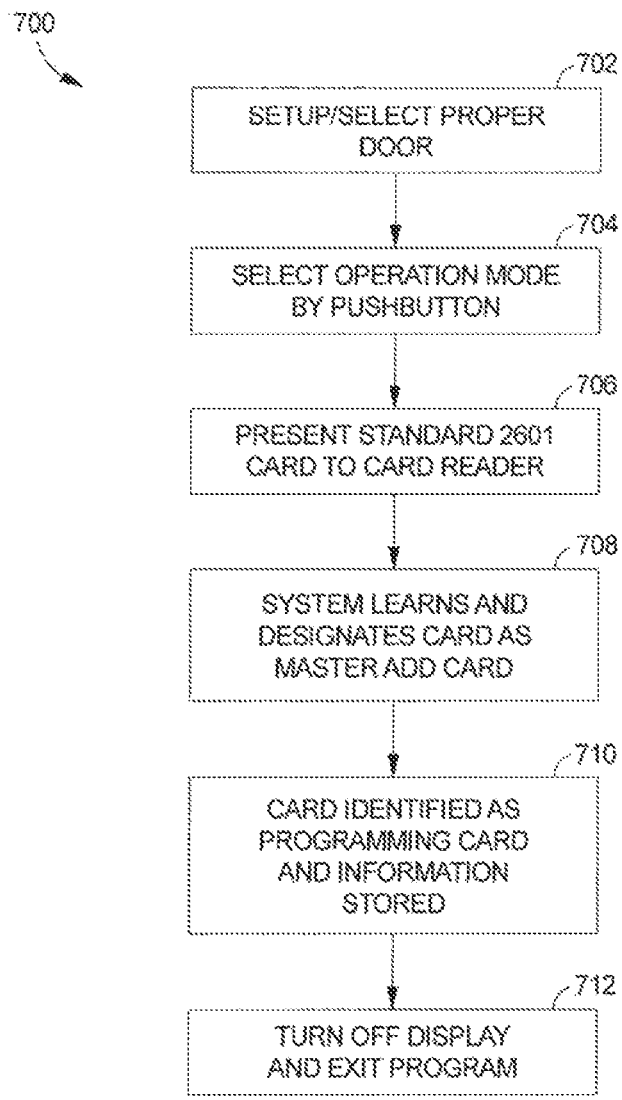
FIG. 7 is an operational flow chart for the programming of the controller device of FIGS. 2A, 2B and 3 to enable the authorization management aspect of the present invention.

FIG. 7 illustrates the operational flow 700 for the programming of a controller device to perform credential additions or deletions by enabling the controller device to accept a standard Wiegand 2601 card as the Master Add or Master Delete. It is assumed in the flow 700 that a Wiegand 2601 card reader is connected to the controller 12 for operation of door 1 or door 2.

Referring to both FIGS. 7 and 2A, at step 702, a security officer or similarly authorized user with physical access to the controller 12, moves the slide switch SW3 into a position marked on the PCB 200 corresponding to the appropriate door connection of the card reader 20. The user then presses the push button SW2 repeatedly until the number '3' is shown on the display DIS1, at step 704. This places the controller 12 in program mode as specified by the mode listing 202 on PCB 200. In this mode, the controller 12 is set to learn a new Master Add. At step 706, a standard card is presented to the card reader 20. The controller 12 learns the presented standard card as the Master Add, at step 708. Next, the controller adds the credentials of the new Master Add to the data store and marks or otherwise identifies it as a programming card, at step 710. The learning of the card causes the display DIS1 to be turned off and program mode is exited at step 712. A similar procedure would be followed to learn the Master Delete, with the exception being that the mode listing for that process is the number '4' rather than '3'. Thereafter, the user may use the Master Add or Master Delete to place the controller in the programming mode for adding or deleting individual user cards to/from the credentialed identities in a conventional manner.

The controller 12 also communicates with PC 10, as shown in FIG. 1, for a variety of reasons including the need to program or update the controller 12 or in some cases provide security related data on an ongoing basis. Communication may be performed through the USB port of the PC 10 and the USB connector J12 (FIG. 3J) of the microcontroller 26, effectively the USB port of the controller 12, via communication link 14. As would be appreciated by one skilled in the art, communication link 14 may be a hard-wired link or wireless link, also communication link 14 may run between USB port of the controller 12 and any other Input/Output (I/O) port of PC 10 including a wired or wireless port, Local Area Network (LAN), Wide Area Network (WAN), Internet port, modem port or blue tooth. Such variations are contemplated and are within the scope of the present invention. For security reasons, the data transmitted via communication link 14 needs to be encrypted, thereby securing the link 14.

In an aspect of the present invention, communication link 14 is encrypted by providing matching cipher keys in both the PC 10 and the controller 12. In order to overcome the readily apparent problem presented by the limited processing capability of the controller 12 and the other limitations previously identified, the present invention provides in one aspect, a unique pseudo private/public seed system for dynamically generating the cipher keys in the PC 10 and controller 12.

Figure 8:
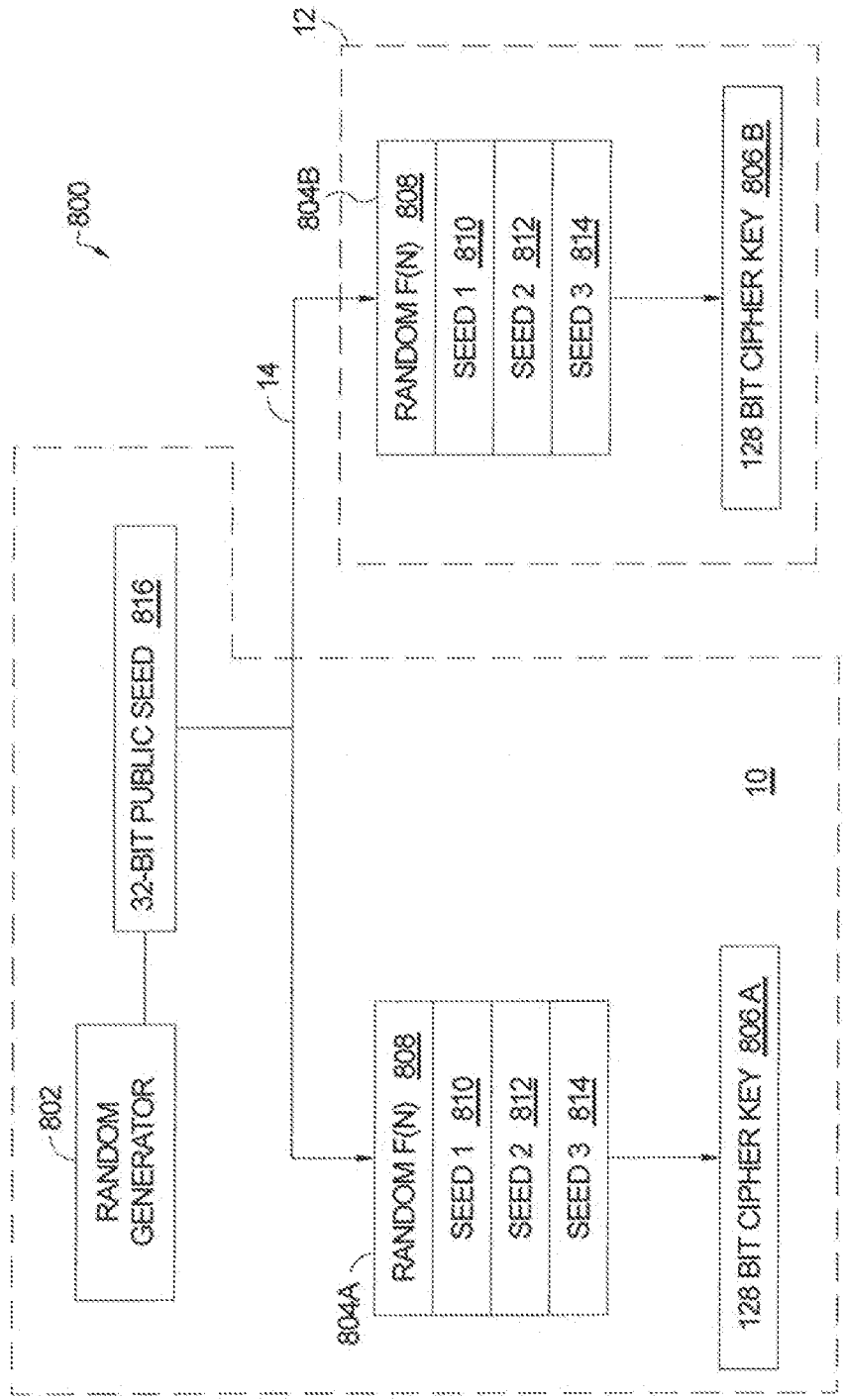
FIG. 8 is a block diagram representation of a pseudo private/public seeds system according to an aspect of the present invention.
Figure 9:
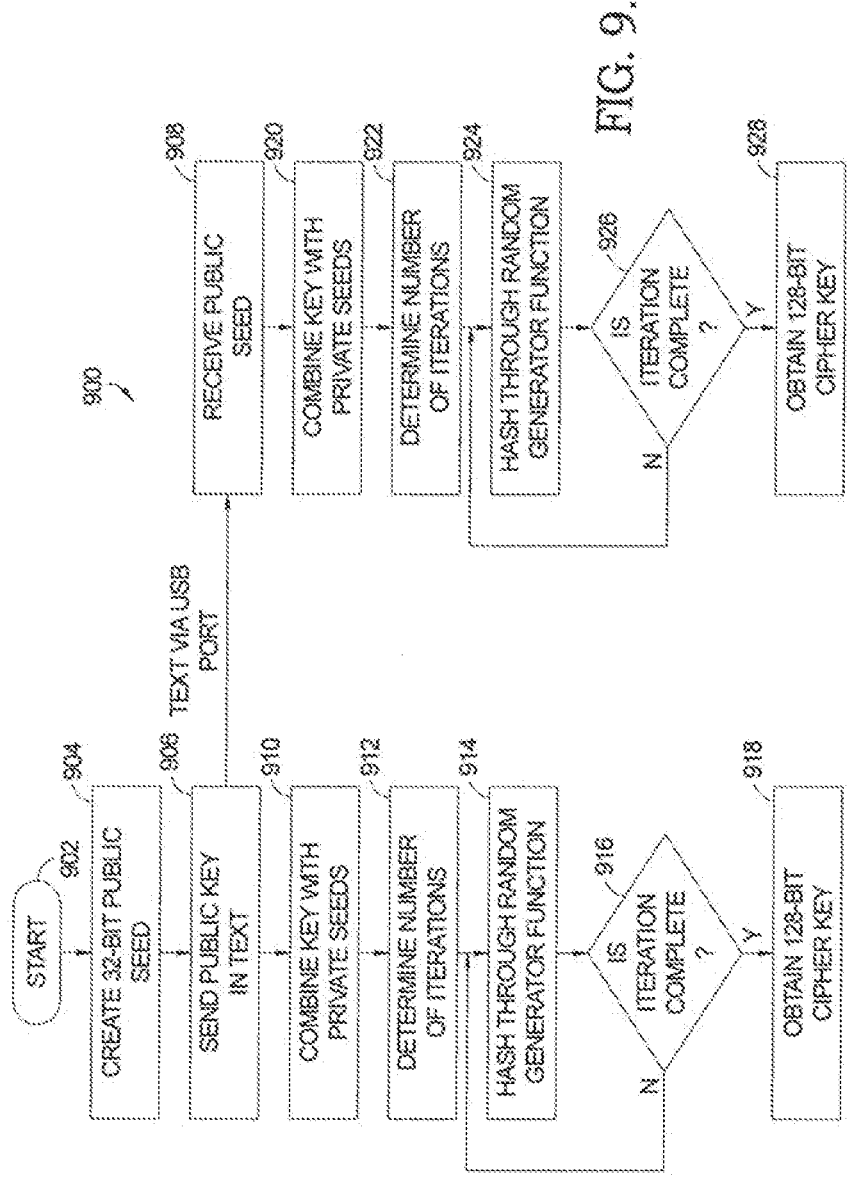
FIG. 9 is an exemplary operational flow chart for encrypted data transfer between the controller and PC according to an aspect of the present invention.

In operation, and as more readily understood with reference to FIG. 8 and FIG. 9, the present invention encrypts data communicated via the link 14. As shown, a pseudo private/public seed system 800 is defined by a single random number generator 802 in the PC 10 and two identical cipher generating algorithms 804A, 804B that individually produce identical cipher keys 806A, 806B in each of the PC 10 and controller 12. Importantly, the random generator 802 is a cryptographically strong random number generator. As known in the art, a cryptographically strong random number generator is defined as a random number generator that passes all statistical tests that run in polynomial time asymptotically. Such a random number generator will pass any statistical test for randomness that does not require an exponentially increasing, to an infinite amount, of time to run. All such polynomial time statistical tests will be unable to distinguish the random number generator from a true random source. Each cipher generating algorithm 804A, 804B comprises pseudorandom function 808, first private seed 810, second private seed 812, and third private seed 814.

Turning to FIG. 9, and with reference thereto, the operational flow of the seed system 800 will be described. The communication program starts a communication session at step 902. At step 904, the random number generator 802 creates a 32-bit public key 816. The public key 816 is communicated in plain text from the PC 10 to the controller 12 on the communication link 14, at step 906. At step 908, the controller 12 receives the public seed. Following this, the PC 10 and the controller 12 each separately perform identical operational steps, utilizing generating algorithms 804A and 804B respectively.

On the PC 10, processing continues at step 910 by combining the public key 816 with the three private seeds 810, 812 and 814. At step 912, the process utilizes the public key 816 to determine an iteration count. Next at step 914, the combined public key 816 and private seeds are hashed through the pseudorandom function 804A. A determination is made at step 916, regarding whether or not the required number of iterations through the function 808, as determined in the previous step, have been accomplished. If the result of that determination is in the negative, processing loops back to step 914 for hash iteration. If the result of the inquiry at step 916 is in the affirmative, processing proceeds to step 918 where 128-bit cipher key 806A is available.

On the controller 12, processing continues at step 920 by combining the public key 816 with the three private seeds 810,812 and 814. At step 922, the process utilizes the public key 816 to determine an iteration count. Next at step 924, the combined public key 816 and private seeds are hashed through the pseudorandom function 804B. A determination is made at step 926, regarding whether or not the required number of iterations through the function 808, as determined in the previous step, have been accomplished. If the result of that determination is in the negative processing loops back to step 924 for hash iteration. If the result of the inquiry at step 926 is in the affirmative, processing proceeds to step 928 where 128-bit cipher key 806B is available.

With both the PC 10 and controller 12 having the same 128-bit cipher key 806A, 806B the communication link 14 goes secure. The cipher key 806A, 806B changes with every session thereby eliminating any drawbacks of utilizing static private seeds 810, 812 and 814. Furthermore, the number of iterations is also random and is based on the public seed itself. Even further, the method used to generate the cipher key is complex enough so that it cannot be memorized but it is straightforward enough to be performed by the microcontroller 26 of the controller 12.

Figure 10:
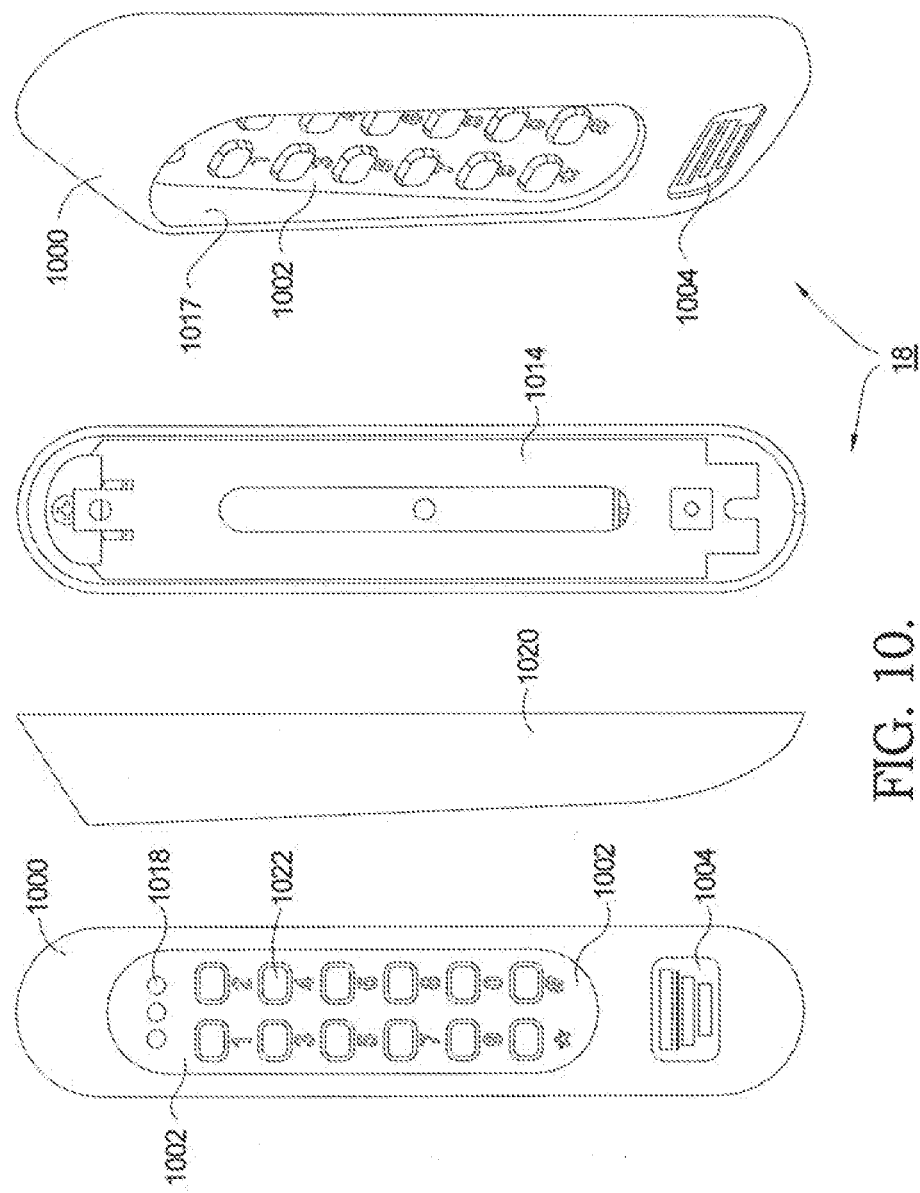
FIG. 10 is an illustration of several views of an authentication keypad.
Figure 11:
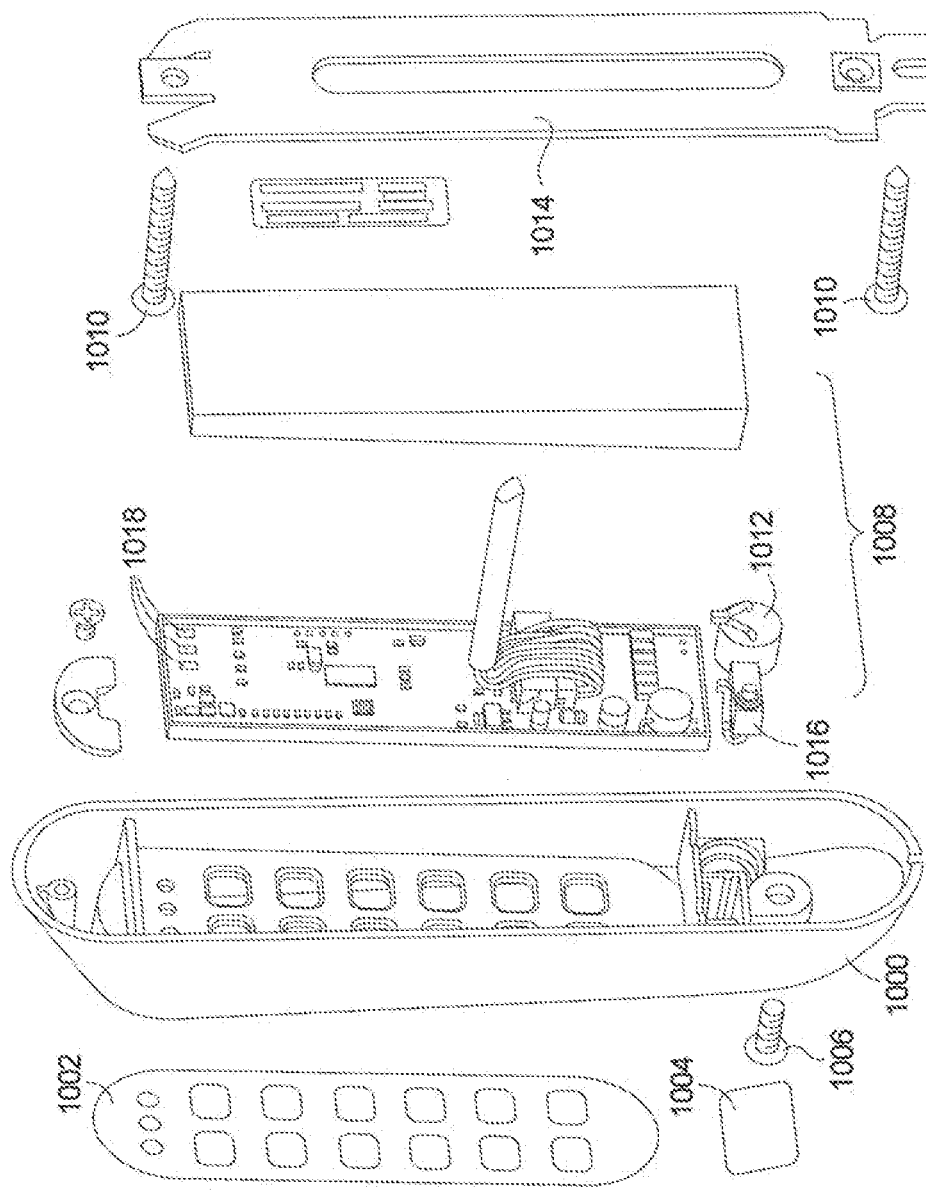
FIG. 11 is an exploded view of the authentication keypad of FIG. 10.

Another aspect of the present invention relates to the physical attributes of keypads 18A, 18B, collectively referenced as keypad 18. The physical positioning, profile, features, security and aesthetic issues are addressed by the keypad of the present invention, as best seen in FIG. 10 and the exploded view of FIG. 11. As shown, the keypad may include a housing 1000, an overlay 1002 for a keypad and PCB assembly 1008, a logo overlay 1004 obscuring the housing installation screw 1006, the keypad and PCB assembly 1008, a pair of base mounting screws 1010, an audio indicator 1012, a mounting base 1014 and a tamper switch 1016 that is disposed such that it will activate if the housing 1000 is separated from mounting base 1014. The housing 1000 may include recess 1017 and may be adapted to provide for a recessed placement of the keypad assembly 1008, whereby the keys of overlay 1002 and the LEDs 1018 can only be seen within a narrow viewing angle. In other words, and as more clearly apparent in the side view 1020 (FIG. 10) of the keypad, the keys 1022 and LEDs 1018 would not be readily visible for example to someone observing a user from down the hall or by someone standing to the side of the user because their visibility would be obscured by recess 1017.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements or components thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. An access control system for providing bi-directional data communication between a controller and remotely connected one or more authentication devices, for identification of the one or more authentication devices to the controller, the system comprising:

a first microcontroller located in the controller and configured to transmit a data signal in the form of a ping to said one or more authentication devices wherein said transmitted data signal is received by said one or more authentication devices;

a second microcontroller located in the one or more authentication devices;

a status mode indicator disposed within the one or more authentication devices, the status mode indicator purposed to provide a status mode of the controller to a user at the one or more authentication devices;

a shared conductor and a unidirectional data communication path, both extending from the controller to each of the distantly connected one or more authentication devices, wherein said shared conductor is configured to transmit said data signal from said controller to said one or more authentication devices, and wherein the unidirectional data communication path is configured to transmit a response from the one or more authentication devices to the controller, after the one or more authentication devices recognizes said transmitted signal;

a status mode indicator driver circuit in the controller, the driver circuit operably coupled to the first microcontroller for providing controller programming status;

wherein the driver circuit activates the one or more authentication device's status mode indicator via the shared conductor to convey controller programming status;

wherein the status mode indicator is further coupled to an internal universal synchronous-asynchronous receiver/transmitter (USART) of the second microcontroller, and the status mode indicator driver circuit is further coupled to the internal USART of the first microcontroller, whereby the controller sends a signal via the first microcontroller and the one or more authentication devices receives the signal via the second microcontroller and the one or more authentication devices provides a response on the unidirectional data communication path thereby identifying the one or more authentication devices to the controller.

2. The access control system in accordance with claim 1 wherein said status mode indicator is a light emitting diode (LED).

3. An access control system for providing bi-directional data communication between a controller and remotely connected one or more authentication devices, for identification of the one or more authentication devices to the controller, the system comprising:

a first microcontroller located in the controller and configured to transmit a data signal in the form of a ping to said one or more authentication devices wherein said transmitted data signal is received by said one or more authentication devices;

a second microcontroller located in the one or more authentication devices; and a shared conductor and a unidirectional data communication path both extending from the controller to each of the distantly connected one or more authentication devices, wherein said shared conductor is configured to transmit said data signal from said controller to said one or more authentication devices, and wherein the unidirectional data communication path is configured to transmit a response from the one or more authentication devices to the controller, after the one or more authentication devices recognizes said transmitted signal.

4. A method of providing bi-directional data communication between a controller and remotely connected one or more authentication devices within an access control system, for identification of the one or more authentication devices to the controller, the method comprising the steps of:

providing an access control system comprising a first microcontroller located in the controller; a second microcontroller located in the one or more authentication devices; a shared conductor and a unidirectional data communication path both extending from the controller to each of the distantly connected one or more authentication devices, the unidirectional data communication path limited to providing data communication from the one or more authentication devices to the controller, a respective shared conductor providing data communication between the controller and a respective authentication device; and a driver circuit in the controller, the driver circuit operably coupled to the first microcontroller for providing controller programming status;

generating a ping at the first microcontroller and transmitting the ping via the shared conductor to the one or more authentication devices;

receiving the transmitted ping at the one or more authentication devices;

recognizing the transmitted ping at the one or more authentication devices; and sending a response from the one or more authentication devices to the controller via the unidirectional data communication path.

* * * * *